Jan. 4, 1966 J. GAMMEL 3,227,962

INPUT STAGE FOR ULTRA HIGH FREQUENCY AMPLIFIERS

Filed March 2, 1960

United States Patent Office

3,227,962
Patented Jan. 4, 1966

3,227,962

INPUT STAGE FOR ULTRA HIGH FREQUENCY AMPLIFIERS

Josef Gammel, Munich, Germany, assignor to Siemens & Halske Aktiengesellschaft, Berlin and Munich, Germany, a corporation of Germany Filed Mar. 2, 1960, Ser. No. 12,462
Claims priority, application Germany, Mar. 6, 1959, S 62,034
4 Claims. (Cl. 330—150)

This invention relates to an input stage for ultra high frequency amplifiers and is particularly concerned with a substantially noise-free electronic input circuit for apparatus employed for amplifying short electromagnetic waves, especially for intermediate frequency amplifiers utilized in directional wireless operations.

The various objects and features of the invention will be brought out in the course of the explanations which will be rendered below with reference to the accompanying drawing.

Figure 1:
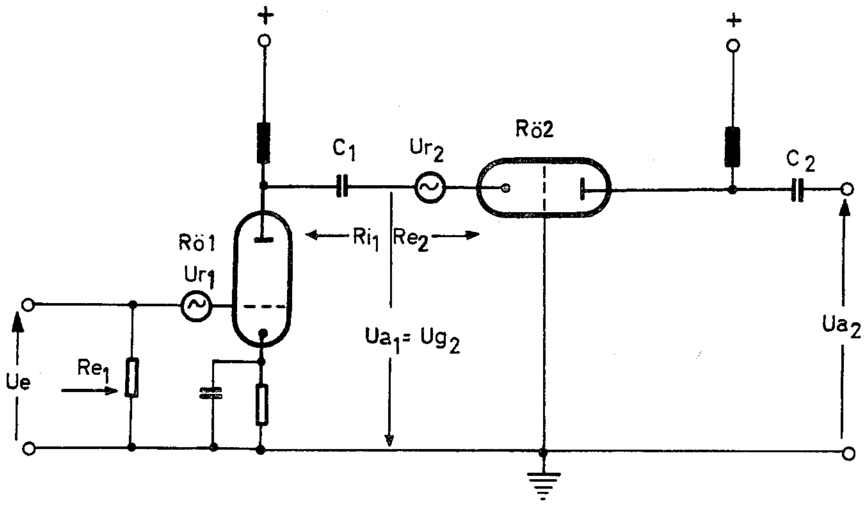
Figure 2:
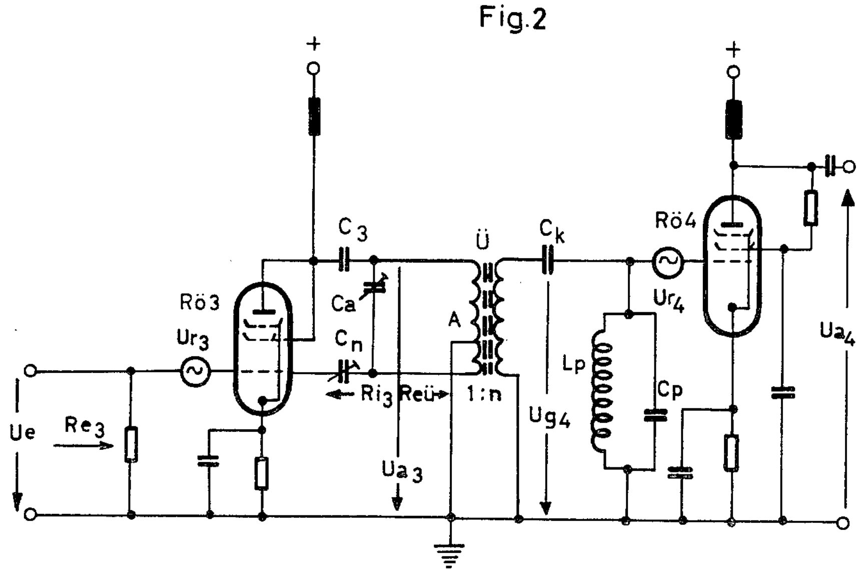

FIG. 1 shows a known two-stage cascade input circuit for ultra high frequency amplifiers, employing triodes with characteristics exhibiting agent transconductance; and FIG. 2 illustrates an input circuit according to the present invention.

As is known, the sensitivity of an amplifier arrangement is determined by the noise of the tubes of the input stage. Proper reception becomes impossible when the voltage of the input signal approaches the magnitude of the noise voltage. Accordingly, tubes with inherent noise as low as possible are used in such input stages. The most favorable properties insofar as noise is concerned are exhibited by triodes with a great transconductance. The use of such triodes in input circuits for ultra high frequency amplifiers has become known in connection with the socalled cascade circuit, comprising, as shown in FIG. 1, two stages, one of which is represented by a triode R*o*1 connected in cathode-base circuit and operative with respect to the electronic input impedance R*e*2 of a second triode R*o*2 which is connected in grid-base circuit. This cascade circuit combines at high input impedance the amplifying properties of a pentode with the favorable signal-to-noise-ratio of a triode.

The peculiarity of the cascade circuit requires the use of special tubes and the operating conditions are such that only the second stage is available for amplifying the input signal.

Special tubes are required because the construction with available pentodes (in triode circuit), as they are generally employed in ultra high frequency amplifiers, fails at the second stage. It must be considered in this connection that the suppression grid of such a customary ultra high frequency pentode is inside of the tube-vessel directly connected with the cathode, such pentode, connected as a triode in grid-base circuit therefore exhibiting high interaction between anode and cathode, which excludes its use in a cascade circuit for short electromagnetic waves. Accordingly, at least two different types of tubes are used in ultra high frequency amplifiers with high input sensitivity. This situation is for economical reasons troublesome, especially in connection with commercial apparatus and installations, since the maintenance of amplifiers with two or more types of tubes is rendered considerably more involved than it would be in connection with amplifiers equipped with only one type of tubes.

While the cascade circuit exhibits favorable signal-to-noise-ratios as well as high input impedance and stability at high frequencies, the fact that only the second stage can be utilized for amplifying the input signals must be considered as a drawback.

The object of the invention is to provide an input circuit of the abovedescribed kind exhibiting considerable improvements while retaining the input sensitivity that may be obtained with the cascade circuit.

The object of the invention is realized in connection with an amplifier arrangement for very short electromagnetic waves, especially an intermediate frequency amplifier for directional wireless operation with substantially noise-free input stage, by the provision in the input stage, of a pentode connected as a triode in cathode-base circuit and operating as an amplifying element, said pentode operating free of reaction with respect to the low ohmic input impedance of a transformer which is supplemented to a band pass, for highly transforming the anode alternating voltage to a further pentode being connected in cathode-base circuit with the secondary of the transformer in the input circuit.

The input circuit according to the invention amplifies the alternating input voltage in two stages in similar manner as the cascade circuit. The important difference and advantage resides however in the fact that the first stage does not directly operate with respect to the electronic input impedance of a triode connected in grid-base circuit, but with respect to the low ohmic input of a transformer supplemented to a band pass, the high ohmic output of which extends to a highly amplifying pentode connected in cathode-base circuit, which is serially related to the transformer and forms the second stage.

The input sensitivity of the amplifier circuit according to the invention corresponds in all respects to that of the previously noted cascade circuit, exhibiting however considerably higher amplification since the amplification of the first stage can be made greater than 1, without consideration of the transformer which effects high transformation of the alternating voltage with respect to the grid of the second stage.

The circuit according to the invention which is adapted for highest input sensitivity has moreover the advantage that it can be constructed with available ultra high frequency pentodes—triodes can of course also be used—thus making it possible to equip ultra high frequency amplifiers exhibiting high input sensitivity with tubes of identical type.

The transformer which is supplemented by a band pass can also be advantageously substituted by an equivalent circuit, for example, by a capacitive network or by a tapped coil of a resonant circuit.

An embodiment of the invention will now be described and compared with the known cascade circuit.

As already noted, FIG. 1 shows the known cascade circuit constructed of two stages. The alternating input voltage U*e* is extended to the control grid of the triode R*o*1 which is connected in cathode-base circuit and which operates by way of a coupling capacitor C1 with respect to the electronic input impedance R*e*2 of the serially disposed triode R*o*2 connected in grid-base circuit. The amplification of the first stage $V1=Ua1/Ue$ corresponds approximately to the value 1, since the internal amplification of the triode R*o*1 is practically equal to the division ratio of the voltage divider consisting of the internal impedance R*i*1 of the triode R*o*1 and the input impedance R*e*2 of the triode R*o*2. The amplification of the alternating voltage as such is effected in the second stage so that the total amplification of the cascade circuit amounts to $$Vgc=Ua2/Ue\approx Ua2/Ua1$$

The output voltage U*a*2 is obtained in usual manner from the second stage by way of a coupling capacitor C2 between the anode of the triode R*o*2 and ground.

The amplification $V1\approx 1$ of the first stage secures a high input impedance R*e*1 since the feedback coupling which is effective by way of the grid-anode capacity and proportional to the amplification V1 is correspondingly low. The slight amplification V1 also impedes the tendency of the first stage for self-excitation. This tendency is likewise based upon the grid-anode capacity over which is effected the feedback of the energy of the anode circuit in the grid circuit. The second stage has no tendency for self-excitation due to the fact that the triode R*o*2 is connected in grid-base circuit, a reaction of the anode circuit being thereby largely excluded by the grounding of the control grid. The amplifying properties of the triode R*o*2 therefore can be fully utilized.

Solely the noise voltage U*r*1 of the triode R*o*1 is decisive for the input sensitivity of the cascade circuit. The triode R*o*2 contributes despite the amplification $V1 \approx 1$ of the first stage practically nothing to the noise voltage due to the fact that it is so far as the tube noise is concerned strongly in feedback by the high internal impedance R*i*1 of the triode R*o*1 as compared with the input impedance R*o*2.

The input circuit according to the invention is illustrated in FIG. 2. The pentode R*o*3 which is connected as a triode in cathode-base circuit corresponds practically to the first stage of the cascade circuit according to FIG. 1. However, as compared with FIG. 1, the pentode R*o*3 operates over its internal impedance R*i*3 and a coupling capacitor C3 with respect to the low ohmic input impedance R*eu* of the primary winding of a transformer U with the transformation ratio 1:*n*, the secondary of the transformer carrying the higher voltage, being connected in parallel with the control input of a successively disposed pentode R*o*4 which is connected in cathode-base circuit. The primary winding of the transformer U is also used for avoiding reaction of the anode circuit to the grid circuit (neutralization) of the pentode R*o*3 which is connected as a triode. The primary winding is for this purpose connected to ground at a tap A, while its lower terminal is connected with the control grid of the pentode R*o*3 by way of the neutralization trimmer C*n*. As compared with the first stage of the cascade circuit, in which the amplification $V1 \approx 1$ is necessarily effected, the stage amplification $V3 = Ua3/Ue$, referred to the anode of tube R*o*3, can be made higher than 1. The upper limit of the amplification V3 is given at the point at which the tendency for self-excitation is still with certainty prevented by the neutralization. V3 will generally not be made greater than 2.5. The high input impedance R*e*3 is in no way effected by the higher stage amplification, since the neutralization circuit disconnects the anode-grid capacity. The alternating voltage U*a*3 on the anode side is by the transformer U highly transformed to $n \cdot Ua3$, so that the amplification V3*u* of the first stage, referred to the secondary side of the transformer U amounts to $V3u = n \cdot V3$. Since the transformation ratio *n* of the transformer U, considering the high ohmic control input of the pentode R*o*4, can be made high ($n \approx 6$), the amplification V3*u* is just as high—reaching generally higher values—as the total amplification of the known two-stage cascade circuit.

The input circuit according to the invention therefore provides, as compared with the cascade circuit, a total amplification $Vg = Ua4/Ue$ which is higher practically by the amplification $V4 = Ua4/Ug4$ of the pentode. The sensitivity of the input circuit according to the invention is likewise determined only by the magnitude of the noise voltage U*r*3 of the pentode R*o*3 which is connected as triode, since the input voltage lying on the control grid of the pentode R*o*4, which is amplified by the factor V3*u*, is already so high that the noise voltage U4 cannot become operatively effective.

The transformer U may be advantageously supplemented by a selective network with band pass characteristic. In the example shown in FIG. 2, there is, for example, provided as a supplement a two-circuit band filter. Parallel to the primary winding of the transformer U there is connected a trimming capacitor C*a* and parallel to the secondary winding is by way of a coupling capacitor C*k* connected a parallel resonant circuit having the elements L*p* and C*p*. However, a characteristic in the manner of a band pass may also be obtained by means of a trimming capacitor connected in parallel with the secondary winding of the transformer U.

Changes may be made within the scope and spirit of the appended claims which define what is believed to be new and desired to have protected by Letters Patent.

I claim:

1. A substantially noise-free input circuit for UHF amplifiers, such as intermediate frequency amplifiers for directional wireless purposes, having two stages, a first stage containing a pentode circuited as a triode in cathode base connection and a second stage containing a pentode circuited in cathode base connection and having corresponding high input resistance, said two stages being interconnected over a transformer having a high transformation ratio operative to effect high transformation of the alternating anode voltage of the first stage to the control grid of the second stage, and means for compensating the capacitance present between the screen grid and the control grid of the pentode circuited as a triode, the influence of which affects the amplifier properties, by a capacitive feedback with opposed phase, of part of the high frequency voltage appearing at the primary winding of the transformed with respect to the control grid of such tube.

2. A circuit according to claim 1, wherein said transformer is supplemented by means connected respectively in parallel to its primary and secondary windings to form a network which exhibits band pass characteristics.

3. A noise-free input circuit according to claim 2, wherein a trimming capacitor is connected in parallel to the primary winding of the transformer, so as to supplement the transformer to a band pass, and wherein a parallel resonant circuit is connected to the secondary winding over a coupling capacitor.

4. A circuit as defined in claim 2, wherein said tubes are both pentodes of a single type.

References Cited by the Examiner

UNITED STATES PATENTS

| | | | |
|---|---|---|---|
| 1,801,138 | 4/1931 | Carlson et al. | 330—167 |
| 1,940,001 | 12/1933 | Marshall | 330—167 |
| 2,541,818 | 2/1951 | Gruen | 330—196 |
| 2,846,503 | 8/1958 | Kump | 330—196 |
| 2,848,611 | 8/1958 | Bousek | 330—197 |

FOREIGN PATENTS

| | | |
|---|---|---|
| 484,464 | 10/1929 | Germany. |

ROY LAKE, *Primary Examiner.*

ELI J. SAX, *Examiner.*